(12) United States Patent
Chen (10) Patent No.: US 10,380,976 B2
(45) Date of Patent: Aug. 13, 2019

(54) MULTI-SCREEN DISPLAYING METHOD AND DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 28 days.

(21) Appl. No.: 15/577,786

(22) PCT Filed: May 26, 2017

(86) PCT No.: PCT/CN2017/086128
§ 371 (c)(1),
(2) Date: Nov. 29, 2017

(87) PCT Pub. No.: WO2018/120622
PCT Pub. Date: Jul. 5, 2018

(65) Prior Publication Data
US 2018/0293960 A1    Oct. 11, 2018

(30) Foreign Application Priority Data
Dec. 30, 2016   (CN) .......................... 2016 1 1265522

(51) Int. Cl.
*G09G 5/14*   (2006.01)
*G06F 3/16*   (2006.01)
(Continued)

(52) U.S. Cl.
CPC ............. *G09G 5/14* (2013.01); *G06F 3/1446* (2013.01); *G06F 3/16* (2013.01);
(Continued)

(58) Field of Classification Search
CPC combination set(s) only.
See application file for complete search history.

(56) References Cited

U.S. PATENT DOCUMENTS 9,639,175 B2 *   5/2017   Cho .................. G06F 1/1652
9,941,918 B2 *   4/2018   Kim ................... H04B 1/3827
(Continued)

FOREIGN PATENT DOCUMENTS

CN     1791198 A      6/2006
CN     103197879 A    7/2013
(Continued)

OTHER PUBLICATIONS

Display control method and display control device Xu, Ben (Inventor). Lenovo Beijing Ltd (Assignee). CN 105204800 A. (Published Dec. 30, 2015). (Year: 2015).*

*Primary Examiner* — Van N Chow (57) ABSTRACT

Disclosed are a multi-screen displaying method and device. In the method, a user physically folds and splits a curved-surface display screen according to a preset folding line. By software, the curved-surface display screen is divided and split into plural display subscreens by a display interface corresponding to the method of physically folding and splitting the screen, and different display subscreens display different contents to achieve the effect of viewing different display contents for the users' viewing at the same time, so as to improve the experience level of the users.

17 Claims, 5 Drawing Sheets

(51) Int. Cl.
*G06F 3/14* (2006.01)
*H04N 21/41* (2011.01)
*H04N 21/43* (2011.01)

(52) U.S. Cl.
CPC . *G09G 2320/0261* (2013.01); *G09G 2340/14* (2013.01); *G09G 2354/00* (2013.01); *G09G 2380/02* (2013.01); *H04N 21/4122* (2013.01); *H04N 21/4307* (2013.01)

(56) References Cited

U.S. PATENT DOCUMENTS

| | | | |
|---|---|---|---|
| 10,061,346 B2* | 8/2018 | Aurongzeb | G06F 1/1618 |
| 2013/0229324 A1* | 9/2013 | Zhang | G09G 5/00 345/1.3 |

FOREIGN PATENT DOCUMENTS

| | | | |
|---|---|---|---|
| CN | 103295510 A | 9/2013 | |
| CN | 103677569 A | 3/2014 | |
| CN | 103677727 A | 3/2014 | |
| CN | 104598079 A | 5/2015 | |
| CN | 104615393 A | 5/2015 | |
| CN | 105204800 A | 12/2015 | |
| CN | 105404060 A | 3/2016 | |
| CN | 105677228 A | 6/2016 | |
| CN | 105955402 A | 9/2016 | |
| CN | 106020760 A | 10/2016 | |
| CN | 106200803 A | 12/2016 | |
| CN | 106686423 A | 5/2017 | |
| CN | 107024810 A | 8/2017 | |

* cited by examiner

MULTI-SCREEN DISPLAYING METHOD AND DISPLAY DEVICE

The present invention has been filed with foreign priority for a patent application with Patent Application No. 201611265522.X and the title "Multi-screen displaying method and display device" to China Patent Office on Dec. 30, 2016, and the whole content of the invention is cited and combined into this patent application.

FIELD OF INVENTION

The present invention relates to the technical field of displays, in particular to a multi-screen displaying method and a multi-screen display device.

BACKGROUND OF INVENTION

Description of the Related Art

At present, more and more LCD panels need a curved-surface display device, and the curved-surface display device brings different experience to consumers, so that the curved-surface display device becomes a new development trend of the related industry, wherein a flexible curved-surface display device (whose curvature may be changed freely) is favored by users. However, the conventional curved-surface display device just allows a plurality of users to view the same display content. Although the conventional split screen display technology or PBP technology allows users to view different display contents, the curved screen causes interference between the display contents and results in poor visual experience.

SUMMARY OF THE INVENTION

Therefore, it is a primary objective of the present invention to overcome the drawbacks of the prior art by providing a multi-screen displaying method and a multi-screen display device, so that users may view different display contents in the same display screen without being interfered by each other.

To achieve the aforementioned and other objectives, the present invention provides a multi-screen displaying method applied to a display device having a curved-surface display screen, and the method comprises the steps of: prompting a user to select a multi-screen display function of the curved-surface display screen, when a user's folding and splitting the curved-surface display screen according to a preset folding line is detected; obtaining a position information of the preset folding line of the curved-surface display screen when the multi-screen display function of the curved-surface display screen is selected, wherein the preset folding line is a dividing line of adjacent curved-surface display screens formed by folding and splitting the screen; dividing a display interface of the curved-surface display screen into a plurality of display subscreens according to the position information, wherein a split screen line of the two adjacent display subscreens is superimposed with the preset folding line; obtaining the display content selected by the user from the plurality of display subscreens; and displaying the display content selected from the display subscreen through the display subscreen.

The multi-screen displaying method of the present invention further comprises the following steps before obtaining the position information of the preset folding line in the curved-surface display screen: determining whether or not the multi-screen display function of the curved-surface display screen is selected; and obtaining the position information of the preset folding line the curved-surface display screen when the multi-screen display function of the curved-surface display screen is selected.

The multi-screen displaying method of the present invention further comprises the following steps after obtaining the display content selected from the plurality of display subscreens by the user: determining whether or not the display content has audio information; and selecting an audio channel from a plurality of audio channels used in the curved-surface display screen if the audio information has the display content; and outputting the audio information through the selected audio channel.

In the multi-screen displaying method of the present invention, the user folds and splits the curved-surface display screen according to the preset folding line, and the method comprises the step of protruding a display screen corresponding to the preset folding line from the curved-surface display screen for blocking the display contents of the display subscreens on both sides of the split screen line.

In the multi-screen displaying method of the present invention, the preset folding line is a vertical folding line; and the obtained position information of the preset folding line in the curved-surface display screen includes the obtained corresponding column element unit of the vertical folding line in the curved-surface display screen.

To achieve the aforementioned and other objectives, the present invention further provides a display device comprising: a first capturing module, configured to obtain the position information of the preset folding line in the curved-surface display screen if a user's folding and splitting the curved-surface display screen by a user is detected, wherein the preset folding line is a dividing line of adjacent curved-surface display screens formed by folding and splitting the screens; a dividing module, configured to divide the display interface of the curved-surface display screen into a plurality of display subscreens according to the position information, wherein the split screen line and the preset folding line of the two adjacent display subscreens are superimposed with each other; and a second capturing module, configured to capture the display content selected from the plurality of display subscreens by the user; and displaying the display content selected in the display subscreen through the display subscreen.

The display device of the present invention further comprises a first determining module; configured to determine whether or not the multi-screen display function of the curved-surface display screen is selected, and obtaining the position information of the preset folding line in the curved-surface display screen when the multi-screen display function of the curved-surface display screen is selected.

The display device of the present invention further comprises a second determining module, configured to determine whether or not the display content has audio information; selecting module, configured to determine whether or not the display content has audio information; and a selecting module, configured to select an audio channel from a plurality of audio channels used in the curved-surface display screen if the audio information has the display content; and an output module, configured to output the audio information through the selected audio channel.

In the display device of the present invention, the user folds and splits the curved-surface display screen according to the preset folding line, and the display device further comprises: a display screen corresponding to the preset folding line and protruded from the curved-surface display screen for blocking the display contents of the display subscreens on both sides of the split screen line.

In the display device of the present invention, the preset folding line is a vertical folding line, and the first capturing module is configured to capture the vertical folding line of the corresponding column element unit in the curved-surface display screen.

In summation, the user carries out the physical screen folding and splitting method by physically folding and splitting the curved-surface display screen according to the preset folding, and uses a software using the physical screen folding and splitting method to divide the curved-surface display screen corresponding to the display interface split screen into a plurality of display subscreens, and different display subscreens display different contents respectively to achieve the effect of allowing a plurality of users to view different display contents at the same time.

BRIEF DESCRIPTION OF THE DRAWINGS

The technical solution of the preferred embodiment of the present invention may be elaborated by the following simple introduction of the drawings required for describing the invention, and the drawings illustrate some embodiments of the present invention. It is noteworthy that persons having ordinary skills in the art may further have other drawings based on these drawings without paying any creative effort.

DESCRIPTION OF THE PREFERRED EMBODIMENTS

Other features and advantages of the present invention will become apparent in the following detailed description of the preferred embodiments with reference to the accompanying drawings, in which: Exemplary embodiments are illustrated in referenced figures of the drawings. It is intended that the embodiments and figures disclosed herein are to be considered illustrative rather than restrictive.

Figure 1:
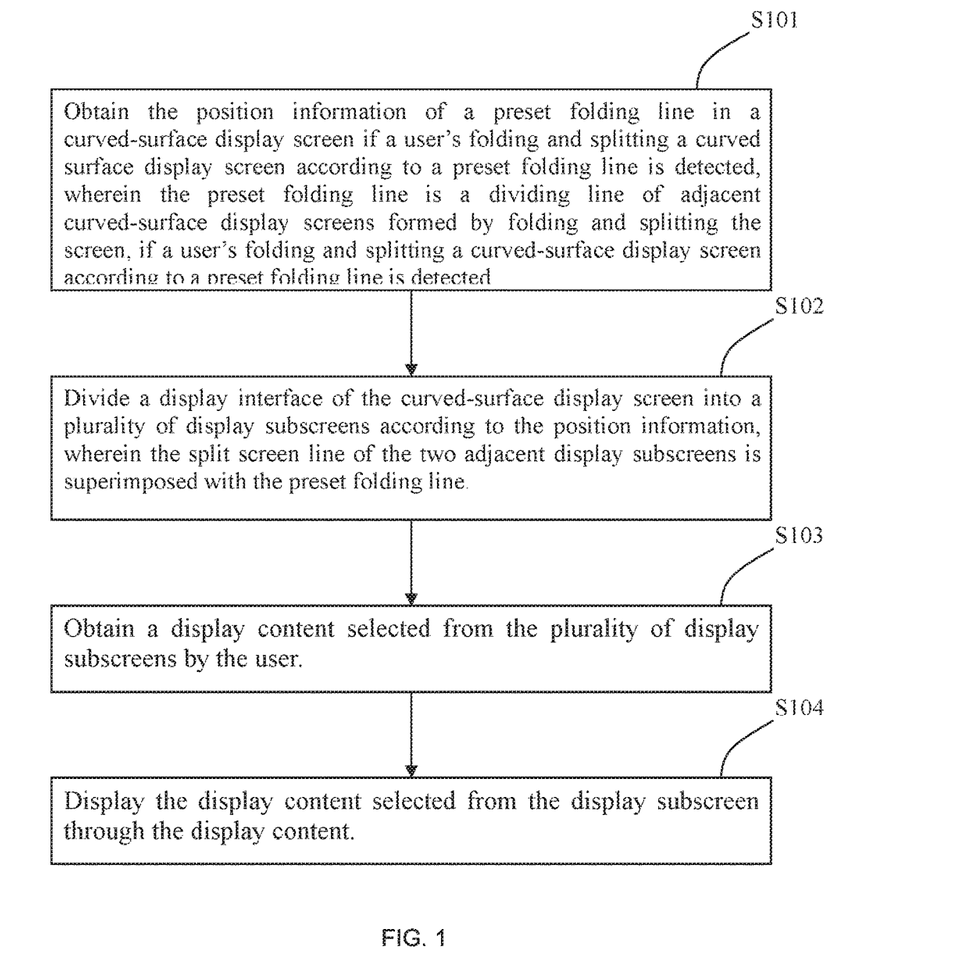
FIG. 1 is a flow chart of a multi-screen displaying method in accordance with a preferred embodiment of the present invention.

With reference to FIG. 1 for a flow chart of a multi-screen displaying method in accordance with a preferred embodiment of the present invention, the multi-screen displaying method is applied to a display device, and the display device comprises a curved-surface display screen, and the curved-surface display screen may be folded into a plurality of curved-surface display screens by external force as shown in FIG. 1. The multi-screen displaying method includes the following steps S101-S104.

S101: obtaining a position information of the preset folding line in the curved-surface display screen if a user's folding and splitting a curved surface display screen according to a preset folding line is detected, wherein the preset folding line is a dividing line of adjacent curved-surface display screens formed by folding and splitting the screen, if a user's folding and splitting a curved-surface display screen according to a preset folding line is detected.

Figure 2:
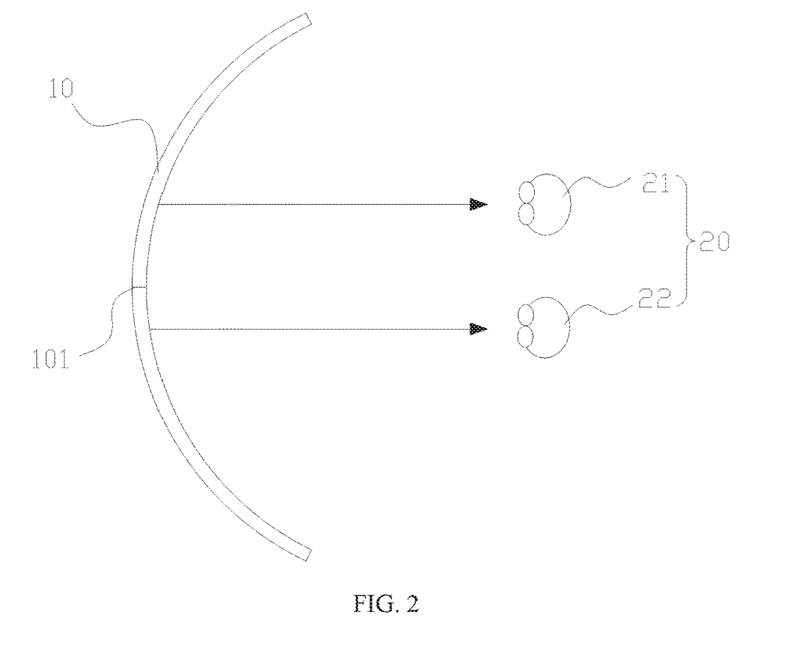
FIG. 2 is a schematic view of a multi-screen displaying method using a curved-surface display screen for a user's viewing in accordance with a preferred embodiment of the present invention.
Figure 3:
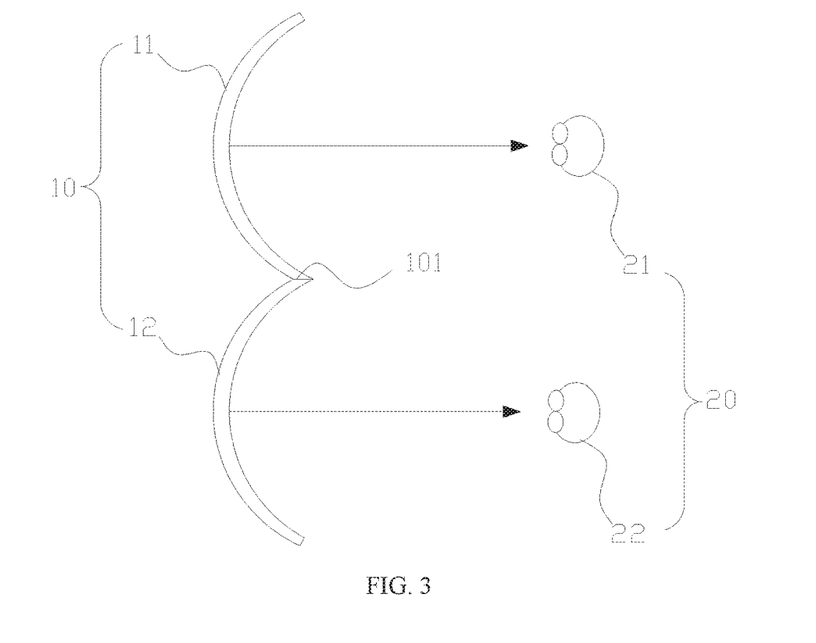
FIG. 3 is a schematic view showing the effect of a multi-screen displaying method using a curved-surface display screen for a user's viewing in accordance with a preferred embodiment of the present invention.
Figure 4:
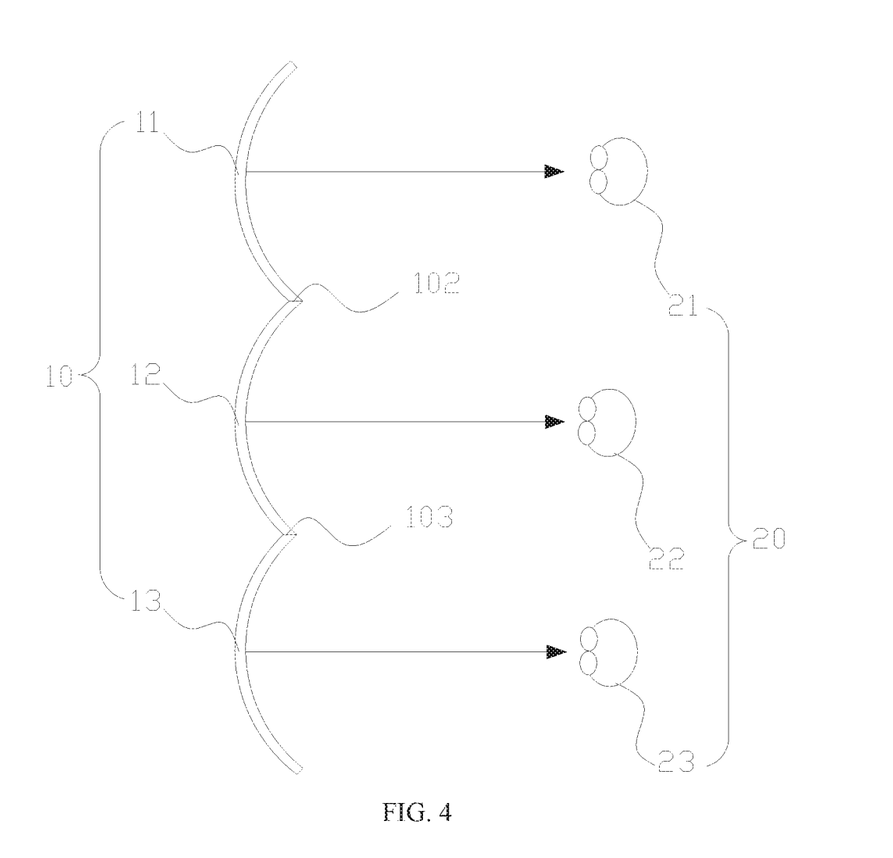
FIG. 4 is a schematic view showing the effect of a multi-screen displaying method using a curved-surface display screen for a user's viewing in accordance with a preferred embodiment of the present invention.

In a preferred embodiment of the present invention, a plurality of users uses the curved-surface display screen to view the display content. If the plurality of users wants to use the curved-surface display screen to view different display contents at the same time, then the curved-surface display screen may be folded and split into at least two curved-surface display screens according to the preset folding line by external force, wherein the preset folding line is a dividing line of adjacent curved-surface display screen formed by folding and splitting the screen. With reference to FIGS. 2 and 3 for a schematic view of a multi-screen displaying method using a curved-surface display screen for a user's viewing in accordance with a preferred embodiment of the present invention and a schematic view showing the viewing effect of the multi-screen displaying method for viewing the display content through the curved-surface display screen respectively, FIG. 2 shows that the curved-surface display screen 10 has a preset folding line 101 or a plurality of preset folding lines 101. If a plurality of users 20 (including a user 21 and a user 22) use the curved-surface display screen 10 to view programs, and both users 21 and user 22 want to use the curved-surface display screen 10 to view different programs at the same time, then the curved-surface display screen 10 may be folded and split into two curved-surface display screens according to the preset folding line 101. In FIG. 3, the curved-surface display screen 10 may be folded and split into the first curved-surface display screen 11 and the second curved-surface display screen 12 according to the preset folding line 101. For a plurality of preset folding lines, the curved-surface display screen 10 may be divided into a plurality of curved-surface display screens such as a first curved-surface display screen 11, a second curved-surface display screen 12, and a third curved-surface display screen 13 according to the preset folding lines such as a second preset folding line 102 and a third preset folding line 103.

When a user's folding and splitting the curved-surface display screen according to the preset folding line is detected, a sensor is used for detection. For example, a pressure sensor is installed at the preset folding line, so that when the pressure sensor detects a pressure value falling within a range of a predetermined pressure threshold value, it is determined that the user has folded and split the curved-surface display screen according to the preset folding line. Now, the position information of the preset folding line in the curved-surface display screen is obtained. Specifically, the preset folding line includes but not limited to a vertical folding line. If the preset folding line is a vertical folding line, then a corresponding column element unit of the vertical folding line in the curved-surface display screen is obtained, and the column pixel unit serves as the position information of the vertical folding line in the curved-surface display screen, and the position information of the preset folding line in the curved-surface display screen may be obtained and confirmed by other methods.

S102: Divide a display interface of the curved-surface display screen into a plurality of display subscreens according to the position information, wherein the split screen line of the two adjacent display subscreens is superimposed with the preset folding line.

In a preferred embodiment of the present invention, the display interface of the curved-surface display screen is divided into a plurality of display sub screens according to the position information. Specifically, the display interface of the curved-surface display screen 10 is divided into a display subscreen of a first curved-surface display screen 11 and a display subscreen of a second curved-surface display screen 12, and both display subscreens are independent and could be a reduced version of the display interface of the original curved-surface display screen 10, or a new display interface. Most importantly, the split screen line of the two display subscreens is superimposed with the preset folding line, and the position of the split screen line is determined by the preset folding line of the curved-surface display screen. Therefore, the curved-surface display screen is physically split (into a plurality of display screens by hardware) and the split screens of the display interface may be displayed by software correspondingly.

S103: Obtain a display content selected from the plurality of display subscreens by the user.

In a preferred embodiment of the present invention, the display content selected from the plurality of display subscreens by the user is obtained. Specifically, when both user 21 and user 22 want to view different display contents at the same time, the aforementioned steps are carried out, and the users may select different video or textual contents from the display subscreen of the first curved-surface display screen 11 and the display subscreen of the second curved-surface display screen 12. For example, the user 21 selects a video A from the display subscreen of the first curved-surface display screen 11 and the user 22 selects a video B from the display subscreen of the second curved-surface display screen 12, and the display contents (which are video A and video B) selected by the users are obtained.

S104: Display the display content selected from the display subscreen through the display content.

In a preferred embodiment of the present invention, if the user 21 selects the video A from the display subscreen of the first curved-surface display screen 11, then the video A will be displayed from the display subscreen of the first curved-surface display screen 11. If the user 22 selects the video B from the display subscreen of the second curved-surface display screen 12, then the video B will be displayed from the display subscreen of the second curved-surface display screen 12. Therefore, different users can view different display contents from the split screens corresponsive to the curved-surface display screen and the display interface. When the display screen is folded according to the preset folding line of the curved-surface display screen, the display screen is protruded from the curved-surface display screen, so that the preset folding line may be used for blocking the display contents of the display sub screens on both sides of the split screen line to allow the users to enjoy two different display screens without mutual interference. Unlike the conventional split screen technology, the present invention allow different user to use the same display screen to view different display contents without being interfered by each other.

Figure 5:
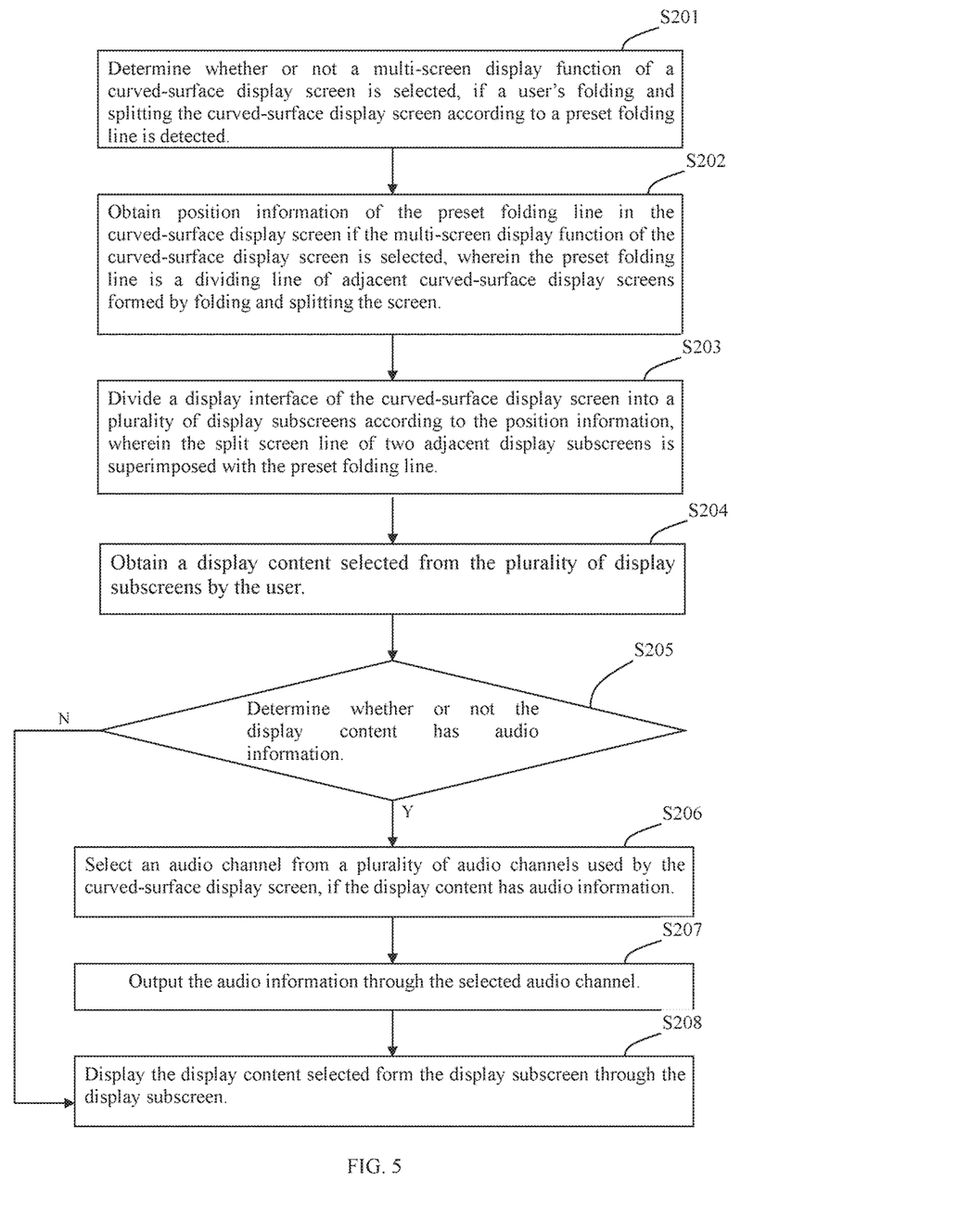
FIG. 5 is another flow chart of a multi-screen displaying method in accordance with a preferred embodiment of the present invention.

With reference to FIG. 5 for the flow chart of a multi-screen displaying method in accordance with a preferred embodiment of the present invention, the multi-screen displaying method is applied to a display device, and the display device comprises a curved-surface display screen which may be bent and folded into a plurality of curved-surface display screens by external force. The curved-surface display screen has a plurality of audio channels, or a corresponsive host system of the curved-surface display screen has a plurality of audio channels. In FIG. 5, the multi-screen displaying method comprises the following steps S201-S206.

S201: Determine whether or not a multi-screen display function of a curved-surface display screen is selected, if a user's folding and splitting the curved-surface display screen according to a preset folding line is detected.

In a preferred embodiment of the present invention, the multi-screen display function of the curved-surface display screen corresponds to a split screen press key mode, and the split screen press key is installed on the curved-surface display screen. After the user has folded and split the curved-surface display screen according to the preset folding line, the user is prompted to select the multi-screen display function of the curved-surface display screen. For example, the split screen press key may be pressed to determine whether or not the multi-screen display function of the curved-surface display screen is selected. If the multi-screen display function of the curved-surface display screen is selected, then go to S202, or else output prompt information to prompt or remind the user to select the multi-screen display function of the curved-surface display screen.

S202: Obtain a position information of the preset folding line in the curved-surface display screen when the multi-screen display function of the curved-surface display screen is selected, wherein the preset folding line is a dividing line of adjacent curved-surface display screens formed by folding and splitting the screen.

In a preferred embodiment of the present invention, the position information of the preset folding line in the curved-surface display screen is obtained. Specifically, the preset folding line includes but not limited to the vertical folding line. If the preset folding line is a vertical folding line, a corresponding column element unit of the vertical folding line in the curved-surface display screen is obtained, and the column pixel unit serves as the position information of the vertical folding line in the curved-surface display screen, and the position information of the vertical folding line in the curved-surface display screen may be found and confirmed by other methods.

S203: Divide a display interface of the curved-surface display screen into a plurality of display subscreens according to the position information, wherein the split screen line of two adjacent display subscreens is superimposed with the preset folding line.

In a preferred embodiment of the present invention, the display interface of the curved-surface display screen is divided into a plurality of display sub screens according to the position information as shown in FIG. 2. Specifically, the display interface of the curved-surface display screen 10 is divided into a display subscreen of a first curved-surface display screen 11 and a display subscreen of a second curved-surface display screen 12, and the two display subscreens may be a reduced version of the display interface of the original curved-surface display screen 10, or may be a new display interface. Most importantly, the split screen line of the two display subscreens is superimposed with the preset folding line, and the position of the split screen line is determined by the preset folding line of the curved-surface display screen. Therefore, the curved-surface display screen can be physically split (into a plurality of display screens by hardware) to achieve the effect of displaying the split screens of the display interface by software.

S204: Obtain a display content selected from the plurality of display subscreens by the user.

In a preferred embodiment of the present invention, the display content selected from the plurality of display subscreens by the user is obtained. Specifically, a user 21 and a user 22 want to view different display contents at the same time. Through the aforementioned steps, the users may select a video or textual content from a display subscreen of the first curved-surface display screen 11 and a display subscreen of a second curved-surface display screen 12. For example, the user 21 selects a video A from the display subscreen of the first curved-surface display screen 11 and the user 22 selects a video B from the display subscreen of the second curved-surface display screen, and the display contents (including the video A and video B) selected by the users are obtained.

S205: Determine whether or not the display content has audio information.

In a preferred embodiment of the present invention, whether or not the display content has audio information is determined. For example, the display contents are video A and video B, and the video A and video B may have audio information. Conventional audio information detection methods may be used for determining whether or not the display content has audio information, and thus will not be described in details. If the display content has audio information, then go to S206, or else go to S208.

S206: Select an audio channel from a plurality of audio channels used by the curved-surface display screen, if the display content has audio information.

In a preferred embodiment of the present invention, the plurality of audio channels used by the curved-surface display screen are independent audio channels which can transmit different audio information at the same time, and different audio channels correspond to different audio equipments such as a headphone interface and a speaker respectively, wherein the headphone interface and the speaker may come with plural quantity and the plurality of headphone interfaces and speakers are coupled to different audio channels respectively.

S207: Output the audio information through the selected audio channel.

In a preferred embodiment of the present invention, the selected audio channel is a different audio channel selected from a different split screen and configured to output the audio information of the display content selected from the split screen through the corresponsive audio channel of the split screen, so as to allow different display contents to be viewed from different display subscreens of different curved-surface display screens at the same time and also to allow each user listen to the audio information of the display content of his/her own. Such arrangement can prevent mutual interference and improve the level of audio and video experience while viewing the display content.

S208: Display the display content selected form the display subscreen through the display subscreen.

In a preferred embodiment of the present invention, if the user 21 selects a video A from the display subscreen in the first curved-surface display screen 11, then the video A will be displayed from the display subscreen of the first curved-surface display screen 11; and if the user 22 selects a video B from the display subscreen in the second curved-surface display screen 12, then the video B will be displayed from the display subscreen of the second curved-surface display screen 12.

In the aforementioned embodiment of the present invention, a user carries out a physical screen folding and splitting method by physically folding and splitting a curved-surface display screen according to a preset folding line. By software, the curved-surface display screen is divided and split into plural display subscreens by a display interface corresponding to the method of physically folding and splitting the screen, and different display subscreens display different contents to achieve the effect of viewing different display contents for the users' viewing at the same time, so as to improve the experience level of the users.

Figure 6:
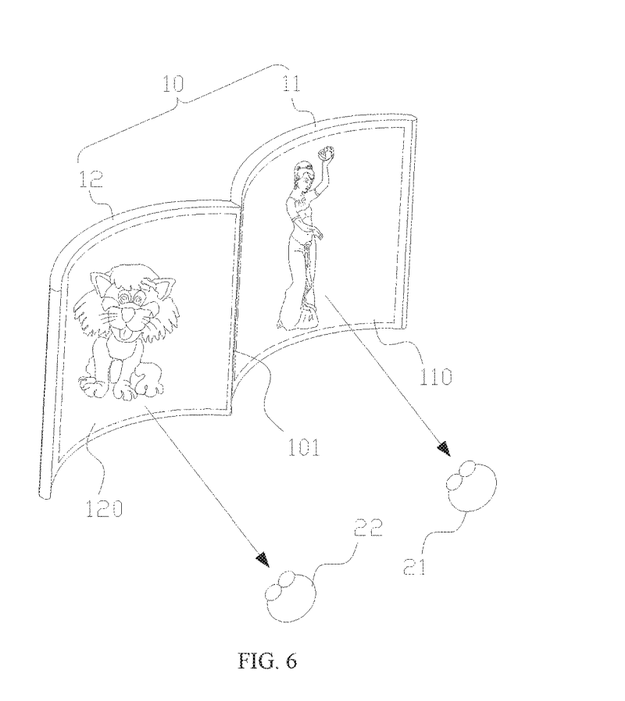
FIG. 6 is a schematic view showing the effect of a multi-screen displaying method using a curved-surface display screen for a user's viewing in accordance with a preferred embodiment of the present invention.

With reference to FIG. 6 for the schematic view of the effect of the multi-screen displaying method applied in an occasion in accordance with a preferred embodiment of the present invention, the curved-surface display screen 10 may be folded and split into two curved-surface display screens (which are the first curved-surface display screen 11 and the second curved-surface display screen 12) according to the preset folding line 101. If users want to view different programs view through the curved-surface display screen 10 at the same time, the curved-surface display screen 10 may be folded and split into the first curved-surface display screen 11 and the second curved-surface display screen 12 according to the preset folding line by external force. If a host system connected to a main control unit of a display screen or the display screen detects that the curved-surface display screen 10 is divided into the first curved-surface display screen 11 and the second curved-surface display screen 12, the position information of the preset folding line in the curved-surface display screen 10 is obtained, and the display interface of the curved-surface display screen 10 is divided into the first display subscreen 110 and the second display subscreen 120 according to the position information, and the display contents selected from the first display subscreen 110 and the second display subscreen 120 by the user are obtained, and then the display contents are displayed from the first display subscreen 110 and the second display subscreen 120 for the viewing by different users. For example, the user 21 and the user 22 can enjoy viewing different display contents at the same time. Since both physical and software screen splitting are combined, therefore the users may use the multi-screen displaying method to view different display contents, and the invention has the effects of allowing users to view two independent display screens at the same time, and improving the level of audio and video experience of the users.

Figure 7:
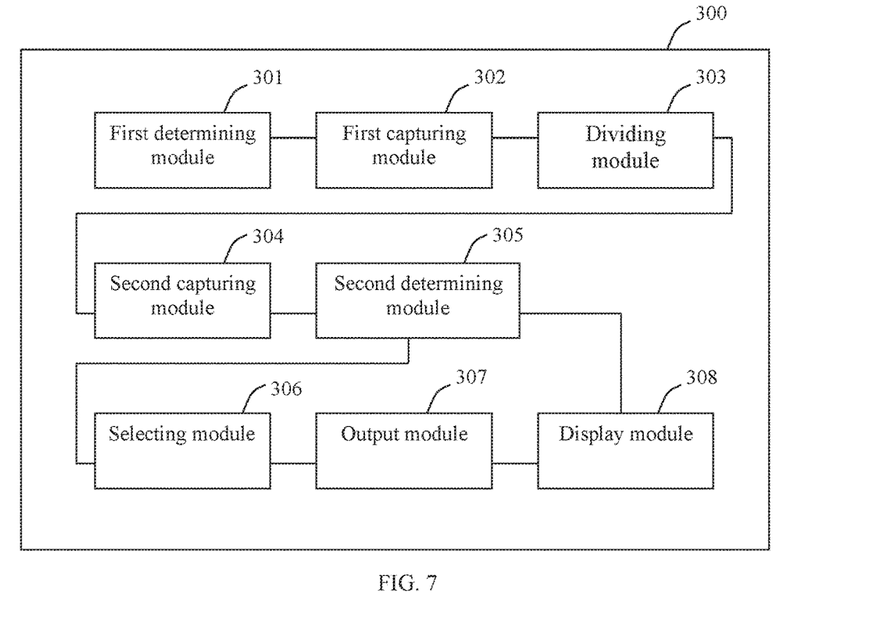
FIG. 7 is a schematic block diagram of a display device in accordance with a preferred embodiment of the present invention.

With reference to FIG. 7 for a schematic block diagram of a display device in accordance with a preferred embodiment of the present invention, the display device comprises a curved-surface display screen, and the curved-surface display screen may be folded and split into a plurality of curved-surface display screens by external force. The display device 300 comprises a first determining module 301, a first capturing module 302, a dividing module 303, a second capturing module 304, a second determining module 305, a selecting module 306, an output module 307, and a display module 308.

The first determining module 301 is configured to determine whether or not the multi-screen display function of the curved-surface display screen is selected if a user's folding and splitting the curved-surface display screen according to the preset folding line is detected, wherein the multi-screen display function of the curved-surface display screen may be corressponsive to a split screen press key mode, and the split screen press key is installed on the curved-surface display screen. After the user has folded and split the curved-surface display screen according to the preset folding line, the user is prompted to select the multi-screen display function of the curved-surface display screen. For example, the split screen press key may be pressed to determine whether or not the multi-screen display function of the curved-surface display screen is selected.

The first capturing module 302 is configured to obtain the position information of the preset folding line in the curved-surface display screen when the multi-screen display function of the curved-surface display screen is selected, wherein the preset folding line is a dividing line of adjacent curved-surface display screens formed by folding and splitting the screen. Specifically, the first capturing module is configured to capture the vertical folding line at corresponding column element unit of the curved-surface display screen. Specifically, the position information of the preset folding line in the curved-surface display screen is obtained, and the preset folding line includes but not limited to a vertical folding line. If the preset folding line is a vertical folding line, the corresponding column element of the vertical folding line in the curved-surface display screen is obtained, and the column pixel unit is the position information of the vertical folding line in the curved-surface display screen, and the position information of the preset folding line in the curved-surface display screen may be obtained by other methods.

The dividing module 303 is configured to divide a display interface of the curved-surface display screen into a plurality of display subscreens according to the position information, wherein the split screen line of two adjacent display subscreens and the preset folding line are superimposed with each other. In FIG. 2, the display interface of curved-surface display screen 10 is divided into a display subscreen of the first curved-surface display screen 11 and a display subscreen of the second curved-surface display screen 12.

The second capturing module 304 is configured to capture a display content selected from the plurality of display subscreens by the user. For example, a user 21 selects a video A from the display subscreen of the first curved-surface display screen 11, and another user 22 selects a video B from the display subscreen of the second curved-surface display screen 12. The display contents (including the video A and video B) selected by the users 21, 22 are obtained.

The second determining module 305 is configured to determine whether or not the display content has audio information. Wherein, a conventional method of detecting audio information is used. If the audio information has the display content, then the selecting module 306 will be used; and if the display content has no audio information, then the display module 308 will be used.

The selecting module 306 is configured to select an audio channel from a plurality of audio channels used by the curved-surface display screen if there is a display content. Wherein, the plurality of audio channels used by the curved-surface display screen are independent audio channels capable of transmitting different audio information simultaneously, and different audio channels are corresponsive to different audio equipments, such as a headphone interface and a speaker respectively.

The output module 307 is configured to output the audio information through the selected audio channel. Specifically, the selected audio channel is a different audio channel selected from a different split screen for outputting the audio information in the selected display content of the split screen through the corresponsive audio channel of the split screen, so as to allow different users to view different display contents from the display subscreens of different curved-surface display screens and listen to the audio information of individual display content, while achieving the effect of preventing mutual interference to improve the level of the visual and audio experience while viewing the display content.

The display module 308 is configured to display the display content selected from the display subscreens through the display subscreen. For example, if a user 21 selects a video A from the display subscreen of the first curved-surface display screen 11, then the video A will be displayed on the display subscreen of a first curved-surface display screen 11; and if a user 22 selects a video B from the display subscreen of a second curved-surface display screen 12, then the video B will be displayed on the display subscreen of the second curved-surface display screen 12.

In the display device of the preferred embodiment of the present invention, the display device may carry out the physical screen folding and splitting method by folding and splitting the curved-surface display screen according to the preset folding line by the user. As to the software aspect, a display interface split screen corresponsive to the physical screen folding and splitting method is configured to divide the curved-surface display screen into a plurality of display subscreens, and different display subscreens display different contents respectively, so as to allow a plurality of users to view different display contents at the same time.

Persons having ordinary skill in the art should be able to understand the operating process of the aforementioned device and module by referring to the corresponding process of the aforementioned method in accordance with the preferred embodiment of the invention, and thus will not be repeated.

The order of the steps of the method in accordance with the preferred embodiment of the present invention may be adjusted, and the steps may be combined, added, or deleted as required.

The unit or module of the preferred embodiment of the present invention may be combined, added, or deleted as required.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-screen displaying method, applied to a display device having a curved-surface display screen, comprising the steps of:

prompting a user to select a multi-screen display function of the curved-surface display screen, when a user's folding and splitting the curved-surface display screen according to a preset folding line is detected;

obtaining a position information of the preset folding line of the curved-surface display screen when the multi-screen display function of the curved-surface display screen is selected, wherein the preset folding line is a dividing line of adjacent curved-surface display screens formed by folding and splitting the screen;

dividing a display interface of the curved-surface display screen into a plurality of display subscreens according to the position information, wherein a split screen line of the two adjacent display subscreens is superimposed with the preset folding line;

obtaining the display content selected by the user from the plurality of display subscreens; and displaying the display content selected from the display subscreen through the display subscreen;

wherein when the user folds and splits the curved-surface display screen according to the preset folding line, the display screen corresponding to the preset folding line is protruded from the curved-surface display screen and towards a side on which the display interface of the curved-surface display screen locates to block the display contents of the display sub-screens on both sides of the split screen line.

2. The multi-screen displaying method of claim 1, further comprising the following steps after obtaining the display content selected from the plurality of display subscreens by the user: determining whether or not the display content has audio information; selecting an audio channel from a plurality of audio channels used by the curved-surface display screen when the display content has audio information; and outputting the audio information from the selected audio channel.

3. The multi-screen displaying method of claim 1, wherein the plurality of display subscreens face a same direction.

4. The multi-screen displaying method of claim 3, wherein the preset folding line is a vertical folding line; and the obtained position information of the preset folding line in the curved-surface display screen includes a corresponding column element unit of the vertical folding line in the curved-surface display screen.

5. The multi-screen displaying method of claim 1, wherein when a user's folding and splitting the curved-surface display screen according to the preset folding line is detected, the method comprises the steps of: installing a pressure sensor at the preset folding line, and determining that the user has folded and split the curved-surface display screen according to the preset folding line when the pressure sensor has detected that the pressure value falls within the range of a predetermined pressure threshold value.

6. A multi-screen displaying method, applied to a display device having a curved-surface display screen, comprising the steps of:

obtaining a position information of the preset folding line of the curved-surface display screen when a user's folding and splitting the curved-surface display screen according to the preset folding line is detected, wherein the preset folding line is a dividing line of adjacent curved-surface display screens formed by folding and splitting the screen;

dividing a display interface of the curved-surface display screen into a plurality of display subscreens according to the position information, wherein a split screen line of the two adjacent display subscreens is superimposed with the preset folding line; and obtaining the display content of the display subscreen selected by the user from the plurality of display subscreens through the display subscreen;

wherein when the user folds and splits the curved-surface display screen according to the preset folding line, the display screen corresponding to the preset folding line is protruded from the curved-surface display screen and towards a side on which the display interface of the curved-surface display screen locates to block the display contents of the display sub-screens on both sides of the split screen line.

7. The multi-screen displaying method of claim 6, further comprising the following steps before obtaining the position information of the preset folding line in the curved-surface display screen: determining whether or not the multi-screen display function of the curved-surface display screen is selected; and obtaining the position information of the preset folding line the curved-surface display screen when the multi-screen display function of the curved-surface display screen is selected.

8. The multi-screen displaying method of claim 6, further comprising the following steps after obtaining the display content selected from the plurality of display subscreens by the user: determining whether or not the display content has audio information; and selecting an audio channel from a plurality of audio channels used in the curved-surface display screen when the audio information has the display content; and outputting the audio information through the selected audio channel.

9. The multi-screen displaying method of claim 7, wherein the plurality of display subscreens face a same direction.

10. The multi-screen displaying method of claim 9, wherein the preset folding line is a vertical folding line; and the obtained position information of the preset folding line in the curved-surface display screen includes the obtained corresponding column element unit of the vertical folding line in the curved-surface display screen.

11. The multi-screen displaying method of claim 6, wherein when a user's folding and splitting the screen according to the preset folding line is detected, the method further comprises the steps of: installing a pressure sensor at the preset folding line; and determining that the user has folded and split the curved-surface display screen according to the preset folding line when the pressure value detected by the pressure sensor falls within a range of a predetermined pressure threshold value.

12. A display device, comprising a curved-surface display screen, and the display device further comprising:

a first capturing module, configured to obtain the position information of the preset folding line in the curved-surface display screen when a user's folding and splitting the curved-surface display screen by a user is detected, wherein the preset folding line is a dividing line of adjacent curved-surface display screens formed by folding and splitting the screens;

a dividing module, configured to divide the display interface of the curved-surface display screen into a plurality of display subscreens according to the position information, wherein the split screen line and the preset folding line of the two adjacent display subscreens are superimposed with each other;

a second capturing module, configured to capture the display content selected from the plurality of display subscreens by the user; and a display module, configured to display the display content selected in the display subscreen through the display subscreen;

wherein the user folds and splits the curved-surface display screen according to the preset folding line, and the display device further comprises: a display screen corresponding to the preset folding line and protruded from the curved-surface display screen and towards a side on which the display interface of the curved-surface display screen locates for blocking the display contents of the display subscreens on both sides of the split screen line.

13. The display device of claim 12, further comprising a first determining module configured to determine whether or not the multi-screen display function of the curved-surface display screen is selected; and the first capturing module is configured to obtain the position information of the preset folding line in the curved-surface display screen, when the multi-screen display function of the curved-surface display screen is selected.

14. The display device of claim 12, further comprising a second determining module, configured to determine whether or not the display content has audio information; and a selecting module, configured to select an audio channel from a plurality of audio channels used in the curved-surface display screen when the audio information has the display content; and an output module, configured to output the audio information through the selected audio channel.

15. The display device of claim 13, wherein the plurality of display subscreens face a same direction.

16. The display device of claim 15, wherein the preset folding line is a vertical folding line, and the first capturing module is configured to capture the vertical folding line of the corresponding column element unit in the curved-surface display screen.

17. The display device of claim 12, wherein the preset folding line is a vertical folding line, and the first capturing module is configured to capture the corresponding column element unit of the vertical folding line in the curved-surface display screen.

* * * * *